US011126699B2

United States Patent
Soriente et al.

(10) Patent No.: US 11,126,699 B2
(45) Date of Patent: Sep. 21, 2021

(54) REPLICA TRUSTED EXECUTION ENVIRONMENT: ENABLING SEAMLESS REPLICATION OF TRUSTED EXECUTION ENVIRONMENT (TEE)-BASED ENCLAVES IN THE CLOUD

(71) Applicant: NEC Laboratories Europe GmbH, Heidelberg (DE)

(72) Inventors: Claudio Soriente, Madrid (ES); Ghassan Karame, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 16/228,820

(22) Filed: Dec. 21, 2018

(65) Prior Publication Data
US 2019/0243963 A1 Aug. 8, 2019

Related U.S. Application Data

(60) Provisional application No. 62/627,247, filed on Feb. 7, 2018.

(51) Int. Cl.
*G06F 21/53* (2013.01)
*G06F 21/57* (2013.01)
(Continued)

(52) U.S. Cl.
CPC .............. *G06F 21/12* (2013.01); *G06F 9/545* (2013.01); *G06F 21/305* (2013.01); *G06F 21/44* (2013.01);
(Continued)

(58) Field of Classification Search
CPC ... H04L 9/0844; H04L 63/0281; H04L 9/085; H04L 9/3247; H04L 63/0884;
(Continued)

(56) References Cited

U.S. PATENT DOCUMENTS

| 10,592,421 B2* | 3/2020 | Rozas ................. G06F 12/0875 |
| 2016/0188873 A1* | 6/2016 | Smith ................... H04L 9/3247 |
| | | 726/22 |

(Continued)

*Primary Examiner* — Mohammad A Siddiqi
(74) *Attorney, Agent, or Firm* — Levdig, Voit & Mayer, Ltd.

(57) ABSTRACT

A method for executing a trusted execution environment (TEE) based application in a cloud computing system. The method includes executing a proxied attestation procedure with a client to enable the client to attest that an enclave management layer (EML) application provided by the cloud computing system runs on a TEE-enabled platform. The method also includes receiving, by the cloud computing system from the client, application code corresponding to the TEE-based application and receiving, by the EML application from the client, application parameters corresponding to the TEE-based application. In addition, the method includes writing, by the EML, application to a secure storage layer, the application parameters corresponding to the TEE-based application and creating, by the cloud computing system, an enclave configured to execute the TEE-based application. Furthermore, the method includes attesting, by the EML application, the enclave and executing, by the enclave configured to execute the TEE-based application, the TEE-based application.

17 Claims, 9 Drawing Sheets

(51) Int. Cl.
  *G06F 21/60* (2013.01)
  *G06F 9/54* (2006.01)
  *H04L 9/08* (2006.01)
  *G06F 21/12* (2013.01)
  *G06F 21/44* (2013.01)
  *H04L 29/06* (2006.01)
  *G06F 21/30* (2013.01)
  *H04L 9/32* (2006.01)

(52) U.S. Cl.
  CPC .............. *G06F 21/53* (2013.01); *G06F 21/57* (2013.01); *G06F 21/577* (2013.01); *G06F 21/606* (2013.01); *H04L 9/085* (2013.01); *H04L 9/0844* (2013.01); *H04L 9/0897* (2013.01); *H04L 9/3247* (2013.01); *H04L 63/0281* (2013.01); *H04L 2209/76* (2013.01)

(58) Field of Classification Search
  CPC . H04L 9/0897; H04L 2209/76; G06F 21/305; G06F 21/606; G06F 21/57; G06F 21/53; G06F 9/545; G06F 21/577; G06F 21/12; G06F 21/44
  See application file for complete search history.

(56) References Cited

U.S. PATENT DOCUMENTS

| | | | |
|---|---|---|---|
| 2018/0019873 A1* | 1/2018 | Kraemer | H04L 63/123 |
| 2018/0150411 A1* | 5/2018 | Kou | G06F 21/57 |
| 2018/0211067 A1* | 7/2018 | Costa | G06F 21/57 |
| 2019/0156301 A1* | 5/2019 | Bentov | G06Q 20/389 |
| 2020/0233953 A1* | 7/2020 | Palsson | G06F 21/53 |

* cited by examiner

| $p_a$ | $mr_a$ | $ak_a$ | |
|---|---|---|---|
| $eid_1$ | $key_1$ | $st_1$ | $eol_1$ |
| $eid_1$ | $key_1$ | $st_1$ | $eol_1$ |

...

| $eid_n$ | $key_n$ | $st_n$ | $eol_n$ |
|---|---|---|---|

FIG. 3

REPLICA TRUSTED EXECUTION ENVIRONMENT: ENABLING SEAMLESS REPLICATION OF TRUSTED EXECUTION ENVIRONMENT (TEE)-BASED ENCLAVES IN THE CLOUD

CROSS-REFERENCE TO PRIOR APPLICATION

Priority is claimed to U.S. Provisional Patent Application No. 62/627,247, filed on Feb. 7, 2018, the entire disclosure of which is hereby incorporated by reference herein.

FIELD

The present invention relates to cloud computing, and more particularly, to the execution of trusted execution environment (TEE)-based applications in the cloud.

BACKGROUND

In recent years, numerous small and medium-sized enterprises (SMEs) as well as large businesses have adopted cloud based information technology (IT) infrastructure solutions in order to reduce deployment, management, and maintenance costs. Cloud based solutions can be particularly cost effective at least partially due to coupling multi-tenancy with tailored distribution algorithms to ensure unprecedented levels of scalability and elasticity at low costs. Applications that run on the cloud can dynamically adapt to current load conditions and achieve considerable cost reductions relative to the provisioning of dedicated computing resources suitable for handling peak usage in the system. For example, if a cloud-based web server receives a large number of requests, the cloud infrastructure can automatically start new instances and multiplex requests across all instances to achieve a sustainable service performance.

Recently, with the proliferation of Trusted Execution Environments (TEEs) such as Intel Software Guard Extensions (SGX), a number of cloud providers are introducing TEE capabilities within their offering. The embedding of TEEs within cloud applications allows secure applications to be designed where application-specific secrets are shielded from any privileged code on the same host. As such, SGX has fueled innovation in the area of secure computation, with an increasing number of proposals that promote various TEE-based applications in the cloud.

Intel SGX, which is available on Skylake and later CPUs, allows applications to run in secure containers (called enclaves) with dedicated memory regions secured with on-chip memory encryption. Access to the encrypted memory is mediated by the hardware, effectively excluding the OS or any other software from the Trusted Computing Base (TCB). Privileged code on the platform can create and add data to an enclave with instructions ECREATE, EADD, EINIT. After creation, the enclave code cars only be invoked using a thin interface via instructions EENTER and ERESUME while enclave code can return by calling the EEXIT instruction to make sure that any sensitive information is flushed before control is given back to the OS.

State persistence across reboots is available through sealing, i.e., hardware-managed authenticated and confidential persistent storage. Enclaves can use instructions EREPORT and EGETKEY to retrieve an enclave-specific (and platform-specific) key to encrypt data before writing it on persistent storage. Keys can be uniquely bound to the identity of an enclave so that no other software can access the key. Keys can also be bound to a "sealing authority" in order to allow secure storage across different versions of the same application. The sealing functionality offered by SGX does not ensure freshness. That is, a malicious OS may present stale state information to an enclave in what is commonly referred to as a rollback attack. This can be mitigated, at least in part, by the use of monotonic counters provided by the platform. However, monotonic counters can be slow and the registries where they are stored can wear out with usage.

SGX was designed with remote attestation in mind. A remote party can verify that an expected piece of code runs in an enclave on an SGX-enabled platform. Current attestation mechanisms use a Direct Anonymous Attestation (DAA) scheme that provides platform anonymity, i.e., the verifier is assured that the enclave runs on an SGX platform without being able to tell it apart from other SGX platforms. Remote attestation is a two-step process. During the first step, the enclave to be attested proves its identity to a system enclave present on every platform and called a quoting enclave. The latter has access to the DAA signing key and produces a publicly verifiable quote that allows the verifier to remotely attest the enclave. In Its current implementation, attestation involves an Intel service, i.e. Intel Attestation Service (IAS), that mediates communication between quoting enclaves and remote verifiers. In particular, the IAS only allows registered parties to issue remote attestation requests. The quote produced by a quoting enclave is also encrypted under the public key of the IAS so that only the IAS can proceed with the verification. The IAS then signs a publicly verifiable statement to confirm that the enclave runs on an SGX platform. As a by-product of the attestation protocol, the prover and the verifier establish a mutually authenticated Diffie-Hellman key, in particular, the verifier signs its ephemeral key and the enclave must hold the corresponding verification key to process the signature. The quoting enclave (and the IAS) also guarantee that the prover ephemeral key belongs to that specific enclave running on an SGX platform.

Enclave migration in the cloud has been described by J. Gu, Z. Hua, Y. Xia, H. Chen, B. Zang, H. Guan, and J. Li, "Secure live migration of SGX enclaves on untrusted cloud," in *International Conference on Dependable Systems and Networks, DSN,* 2017, pp. 225-236, which provides a software development kit (SDK) for enabling enclave migration in the cloud. Here, enclaves are augmented with a thread that carries out state transfer. The thread in the source enclave brings other threads to a quiescent state and ships the internal state to the target enclave; a thread in the target enclave receives the state, installs it and recover execution. Since some state information is only available to the platform, the authors use a number of heuristics to estimate that part of the state and transfer it to the target platform. The authors show that their heuristic are indeed effective in few application scenarios. However, the effectiveness of this heuristic for general SGX applications remains to be assessed.

A scheme (referred to as ROTE) for enabling rollback protection for SGX enclaves was described by S. Matetic, ansoor Ahmed, K. Kostiainen, A. Dhar, D. Sommer, A. Gervais, A. Juels, and S. Capkun, "ROTE: rollback protection for trusted execution," in *USENIX Security Symposium, USENIX Security,* 2017, pp. 1289-1306, Sealing functionality of SGX provides confidentiality and integrity but does not guarantee freshness of sealed data. In a rollback attack, a malicious host leverages this shortcoming to provide enclaves with stale state information. In ROTE, a set of ROTE Enclaves running on different platforms helps one application enclave to maintain monotonic counters that, when used in conjunction with the sealing functionality of SGX, provide state freshness. The set of ROTE enclaves is static and must be setup by an administrator before applications can leverage the service. Notice that ROTE does not deal with applications that span across several enclaves and requires that the application enclave runs on one of the platform that hosts rote enclaves.

Another proposal that addresses rollback attacks in SGX is described by R. Strackx, B. Jacobs, and F. Piessens, "ICE: a passive, high-speed, state-continuity scheme," in *Annual Computer Security Applications Conference, ACSAC,* 2014, pp. 106-115, and is referred to as ICE. Differently from ROTE, ICE is a "standalone" solution that relies on hardware modifications to the platform, including dedicated on-chip registers backed by off-chip NVRAM.

Forking attacks on TEEs in application scenarios where multiple clients interact with an enclave running at a malicious host are described in Brandenburger et al., 2017 47th Annual IEEE/IFIP International Conference on Dependable Systems and Networks (DSN). "Rollback and forking detection for trusted execution environments using lightweight collective memory." In order to counter forking attacks, they require an enclave to create a hash chain with the history of all performed operations. When combined with monotonic counters shared with all clients, such an approach can ensure fork linearizability. See, e.g., D. Mazières and D. E. Shasha, "Building secure file systems out of byzantine storage," in *Symposium on Principles of Distributed Computing, PODC,* 2002, pp. 108-117.

Proxied attestation in IAS has been described in K. Krawiecka, A. Kurnikov, A. Paverd, M. Mannan, and N. Asokan, "Protecting web passwords from rogue servers using trusted execution environments," in *International Conference on World Wide Web,* 2017, pp. 1-16, in which the proxy is registered with IAS and acts on behalf of the (unregistered) verifier towards the IAS. The proxied attestation described therein leverages a proactive, attestation scheme where the enclave itself requests a quote from the platform and binds it to its ephemera; DH key before seeing the ephemeral DH key of the verifier. This design saves round-trips during attestations but is not compliant with the SDK of Intel SGX. Therefore, the scheme described therein requires the application developer to update their code in order to account for changes in the attestation protocol. Furthermore, the attestation protocol proposed therein only provides a unilaterally authenticated DH key exchange, since the enclave cannot be sure that the ephemera; DH key is the one chosen by the verifier and not by the proxy. Mutually authenticated DH key exchange would require the enclave to embed the verification key of the verifier. However, this is not viable if the enclave is meant to be verified by any (previously unseen) user of the cloud service.

Considerable additional recent work has focused on state machine replication (SMR). SMR is a distributed computing primitive for implementing fault-tolerant services where the state of a system is replicated across different nodes, called "replicas." Some replicas may be faulty and their failure mode can be either crash or Byzantine, i.e., deviating arbitrarily from the protocol. The community features a large number of Byzantine Fault Tolerant protocols (BFT). Classical EFT protocols typically require n=3f+1 nodes and $O(n^2)$ communication rounds among those nodes in order to tolerate up to f Byzantine faulty nodes.

Since agreement in classical BFT is expensive, prior work has attempted to improve performance by leveraging hardware security mechanisms such as TEEs. Namely, previous work showed how to use hardware security to reduce the number of replicas arid/or communication phases for BFT protocols. For example, MinBFT (described in G. S. Veronese, M. Correia, A. N. Bessani, L. C. Lung, and P. Verissimo, "Efficient Byzantine fault-tolerance," IEEE Transactions on Computers, January 2013) leverages a trusted counter service to prevent equivocation by faulty replicas. As a result, the number of required replicas can be reduced from 3f+1 to 2f+1 and the number of communication phases can be reduced to 2. Similarly, CheapBFT (described in R. Kapitza, J. Behl, C. Cachin, T. Distler, S. Kuhnle, S. V. Mohammadi, W. Schröder-Preskschai, and K. Stengel, "CheapBFT: Resource-efficient Byzantine fault tolerance," Proceedings of the 7th ACM European Conference on Computer Systems, 2012) uses TEEs in a variant (so-called optimistic) BFT protocol. In the absence of faults, CheapBFT requires only f+1 active replicas to agree on and execute client requests. The other/passive replicas modify their states by processing state updates provided by the active replicas. In case of suspected faulty behavior, Cheap-BFT triggers a transition protocol to activate passive replicas, and can then switch to MinBFT,

SUMMARY

In an embodiment, the present invention provides a method for executing a trusted execution environment (TEE) based application in a cloud computing system. The method includes executing a proxied attestation procedure with a client to enable the client to attest that an enclave management layer (EML) application provided by the cloud computing system runs on a TEE-enabled platform. The method also includes receiving, by the cloud computing system from the client, application code corresponding to the TEE-based application and receiving, by the EML application from the client, application parameters corresponding to the TEE-based application. In addition, the method includes writing, by the EML application to a secure storage layer, the application parameters corresponding to the TEE-based application and creating, by the cloud computing system, an enclave configured to execute the TEE-based application. Furthermore, the method includes attesting, by the EML application, the enclave configured to execute the TEE-based application and executing, by the enclave configured to execute the TEE-based application, the TEE-based application.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the Invention. The features and advantages of various embodiments of the present invention will become apparent by reading the following detailed description with reference to the attached drawings which illustrate the following:

FIG. 3 depicts storage of information for an application according to an embodiment of the invention;

DETAILED DESCRIPTION

Figure 1:
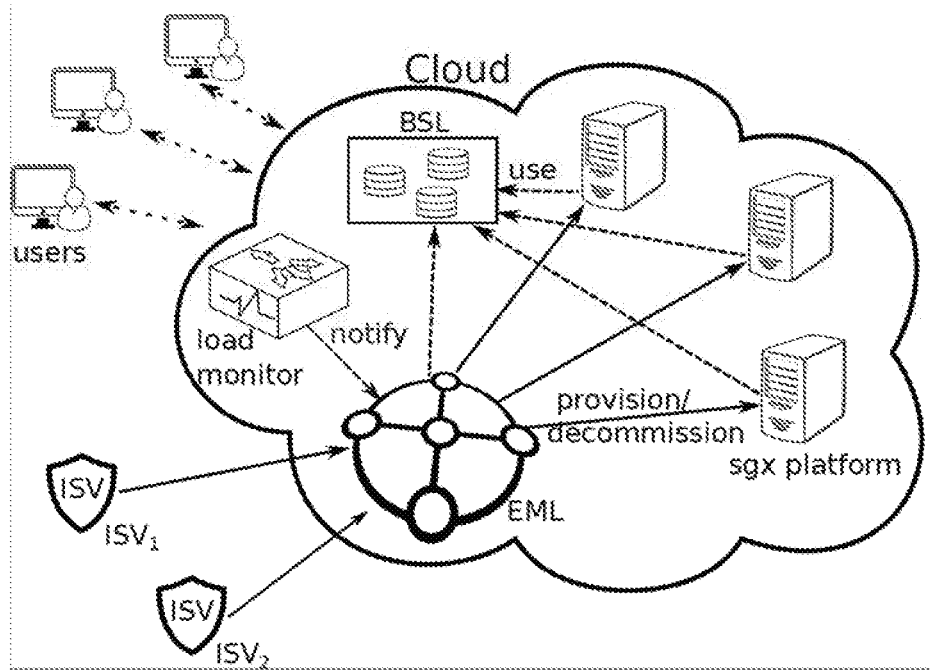
FIG. 1 depicts a model of a system according to an embodiment of the invention.

Although the integration of SGX within the cloud considerably strengthens the threat model for cloud applications, the very nature of the provisioning process for enclaves prevents the cloud operator from provisioning and decommissioning enclaves (or more generically, virtual machines (VMs)) dynamically—thus effectively prohibiting the elasticity of cloud-based enclaves. Namely, dynamic resource allocation for TEE-based applications requires the application owner to be online throughout the application lifetime (e.g., to attest and provision any new application instance that is run for the first time in an enclave) and cannot be done automatically by the cloud infrastructure. This issue becomes even further exacerbated when the TEE-based application needs to keep e.g., user-specific state to ensure its correct operation. In this case, newly provisioned enclaves should maintain a consistent view of such a state—otherwise the security of the overall service might be at risk. For example, consider the case where a mail server running in an enclave requires a client to enter a password for authentication. To mitigate brute-force attacks, the server sets a policy that a client can make at most three failed attempts. However, a malicious cloud provider can abuse enclave replication to increase the number of possible attempts. Here, all the running enclaves should be ideally aware of the number of login attempts for a given user account.

Although a number of studies on SGX security in the cloud have previously been performed, no prior work has addressed enabling seamless replication of SGX enclaves in the cloud.

Embodiments of the present invention propose novel systems and methods that enable dynamic replication and de-commissioning of TEE-based applications in the cloud. Embodiments of the present invention can leverage a distributed SGX-based service layer that interfaces with a Byzantine fault-tolerant storage system to securely orchestrate application and/or enclave replication in the cloud without the active intervention of the application owner. Namely, in embodiments of the present invention, the application owner need only provision the enclave a single time, and any future commissioning and de-commissioning of enclave replicas can be handles by a service layer of such novel systems Systems according to embodiments of the invention can be designed to be fully compliant with the existing Intel SGX software development kit (SDK) and can interface with off-the-shelf enclaves. Systems according to embodiments of the invention can also shield applications from forking attacks by powerful adversaries. Herein below a system according to an embodiment of the invention that enables dynamic replication and de-commissioning of TEE-based applications in the cloud can be referred to by the name ReplicaTEE.

Embodiments of the present invention can be employed in environments in which a cloud provider manages a set of Intel SGX-enabled platforms and in which application owners can upload code to be executed on such platforms. In different environments, the entire application code can be executed in enclaves or application owners may split the application code into sensitive code to be run in an enclave and non-sensitive code that can run as a standard application. Enclaves can, e.g., run computation (such as a map-reduce service) on behalf of an application owner or provide public functionalities (such as an online password-strengthening service) available to all users. Multiple instances of the same application enclave can be started or shut down for reasons such as load, throughput, or efficient resource utilization. In the following, the term application enclave can be used to refer to an instance of application code running in an enclave, and the term application can be used to denote a logical entity spanning multiple enclaves running the same code. The cloud provider can decide whether a new application enclave should be started or a running one should be shut down. For example, the cloud provider could monitor an application behavior and decide to add a new enclave if the load is above a given threshold. Provisioning or decommissioning an application enclave should, however, comply with a deployment policy specified by the application owner. For example, an application owners could set upper and lower bounds for the number of application enclaves that can run simultaneously.

Application enclaves may share state information, in environments in which embodiments of the present application can be employed, immutable and optionally mutable state information may be present. An example of immutable state information is a cryptographic key to be shared across all application enclaves of a transport layer security (TLS) server. New enclaves must be provisioned with the key and, from that moment, can run autonomously. An example of mutable state information could include, for example, a shared key-value store that is read/written by all the application enclaves throughout the application life-cycle.

A PUT/GET Key Value storage abstraction can be provided that exports two operations: PUT(k,v) (which stores value v indexed by key k), and GET(k) (which returns the stored value indexed by key k). In general, the default value for any key is a special value $\perp$, which is not a valid value for a PUT operation. Furthermore, PUT and GET operations generally can only be invoked by authorized clients. An operation (invocation) op can be said to be complete if the client receives the response, i.e., if the client returns from the invocation. In any execution of an algorithm, a complete operation $op_2$ follows $op1$ if the Invocation of $op_2$ follows the response of $op1$ in that execution. Each correct client generally invokes at most one operation at a time (i.e., does not invoke the next operation until it receives the response for the current operation).

Atomic storage instantiation can be based on MinBFT—an efficient Byzantine Fault-Tolerant protocol that reduces the communication rounds and the number of replicas used by conventional BFT protocols, by leveraging functionality from secure hardware, such as Intel SGX. As described above, MinBFT leverages a trusted counter service to prevent equivocation by faulty replicas, and as a result, can reduce the number of replicas required for a BFT protocol from 3f+1 to 2f+1 and can reduce the number of communication phases to 2. MinBFT targets a distributed computing system where the state of the system is replicated across the 2f+1 storage nodes, called "replicas," from which at most/nodes can be Byzantine faulty. Writers send write requests (using the PUT interface) to the replicas, which are all expected to execute the requests in the same order (i.e., maintain a common state). Readers leverage the GET interface to read content written on the storage nodes. MinBFT can rely on the sequential monotonic counter provided by secure hardware to bind each message sent to a unique counter value. This is ensured by requiring a signature from the TEE on all messages sent by the replica; the intuition here is that the TEE will sign messages with the same counter value only once. This effectively prevents replicas from assigning the same counter value to different messages. Replicas share the same configuration in a view where they agree on a "primary" node that is responsible for proposing an order of request messages to the other replicas. Views are sequentially numbered and need to be changed when the configuration is changed. Typically, the primary is initially defined as replica p such that p=v mod N, where v is the view number and N is the number of replicas.

Nodes may fail by crashing while allowing a number of nodes to exhibit Byzantine (or arbitrary) faults. However, it is assumed that all applications running entirely within SGX enclaves do not exhibit Byzantine faults since the SGX framework (i.e., system enclaves, application enclaves, IAS, etc.) is considered to be part of the Trusted Computing Base (TCB). It is also assumed that the Intel Attestation Service is trusted and that the key required to verify quotes it signs is publicly available. These applications can therefore only fail by crashing.

Storage servers typically consist of a large code base (e.g., Paxos accounts for almost 4000 lines of code) that does not fit entirely in an enclave. Such nodes can be Byzantine and it is assumed that an adversary can compromise at most t such cloud-hosted nodes, for example, an adversary might attempt to acquire secrets stored within enclaves or attempt to increase a number of running enclaves in order to mount forking attacks. For example, in the scenario where an authentication server running in an enclave enforces rate-limiting to prevent brute-force attacks, an adversary may attempt to abuse enclave replication to increase the number of possible password attempts.

It can be assumed that an adversary controls the network and therefore controls the scheduling of all transmitted messages in the network, resulting in asynchronous communication. However, it can also be assumed that the adversary is computationally bounded and cannot break cryptographic hash functions or forge message authentication codes. Such assumptions inherently capture malicious clients, if applications offer a public service, an adversary could create take clients and make them interact with the application to increase its advantage in the system. In this respect, a stronger adversary that could mount more sophisticated attacks through control of privileged software (e.g., the OS) on a number of platforms can be assumed.

The cloud itself is not considered to be benign but is entrusted with the decision whether to increase or decrease the number of enclaves that span an application. A rational cloud provider does not have any incentive to manipulate the number of running enclaves though might be interested in Increasing a number of enclaves spanning a given application to bill the application owner for higher resource usage. Note that the cloud provider may be always able to justify over-provisioning of resources for an application by artificially crafting requests to a given enclave (e.g., if resource provisioning is based on a number of incoming requests that the application must handle). Nevertheless, such a strategy can be countered through the use of appropriate business model where the cloud provider pledges in a Service Level Agreement (SLA) to adhere to a minimum Quality of Service level in exchange for a dedicated fee. This would ensure that a rational cloud provider does not benefit financially from over-provisioning (and under-provisioning) resources.

Generally, there is no mechanism that enables enclave replication in a way that is transparent to the enclave owner. A cloud provider can autonomously start an arbitrary number of enclaves as long as they do not require any secret material or access to any confidential state information. However, as soon as an enclave requires a secret key (e.g., a TLS server such as Talos) or access to some confidential state (e.g., an encrypted key-value store such as Secure-Keeper), the enclave owner must be involved in the enclave startup process for attestation and secret provisioning.

Furthermore, apart from the requirement of an online application owner, elastic enclave provisioning in the cloud faces a number of security challenges. For example, if deployment of application enclaves is primarily handled by the cloud, an adversary that manages to break into the cloud infrastructure may attempt to run multiple enclaves of a given application in order to mount forking attacks. The term forking attack captures a broad range of attacks where several instances of an application are run concurrently and inputs are split among them to, e.g., influence the application behavior, or to increase the effect of side channels.

In order to remove the burden on the application owner and to mitigate the aforementioned attacks, one or more embodiments of the present invention can augment a cloud software stack with a layer referred to as an Enclave Management Layer (EML). The EML, which Is dedicated to elastic enclave provisioning, is in charge of provisioning and decommissioning enclaves on behalf of application owners. Note that layer does not decide when an enclave for a given application should be provisioned or decommissioned. This is a decision left to the cloud provider that, for example, can monitor the application load and decide whether the application is over- or under-provisioned. The EML, however, assists the cloud when provisioning or commissioning takes place, to make sure that running enclaves are compliant with the deployment policy defined by the application owner (e.g., no more than n enclaves running concurrently), and that all enclaves belonging to an application have a consistent view and are protected from forking attacks. The EML is designed to run entirely in SGX so that (i) application owners can verify its code and (ii) sensitive data entrusted by application owners to EML, is shielded from any other software running on the same host.

To account for crash failures, one or more embodiments of the present invention can distribute the EML across enclaves and leverage a master-slave approach to ensure progress despite potential crashes. Since the EML itself may be a victim of forking attacks, embodiments of the present invention couple the EML with a Byzantine Fault-Tolerant (BFT) storage layer (BSL) that provides consistent storage despite Byzantine faults of some fraction of its nodes. The EML uses the BSL to maintain at all times a consistent view of the request to provision/remove enclaves and the progress made in handling such requests. Coupling a lightweight management layer such as EML and a BFT storage layer such as BSL enables the cloud to dynamically provision enclaves to an application while simultaneously ensuring protection against forking attacks.

According to an embodiment of the invention, a method is provided for executing a trusted execution environment (TEE) based application in a cloud computing system. The method Includes executing a proxied attestation procedure with a client to enable the client to attest that an enclave management layer (EML) application provided by the cloud computing system runs on a TEE-enabled platform. The method also includes receiving, by the cloud computing system from the client, application code corresponding to the TEE-based application and receiving, by the EML application from the client, application parameters corresponding to the TEE-based application. In addition, the method includes writing, by the EML application to a secure storage layer, the application parameters corresponding to the TEE-based application and creating, by the cloud computing system, an enclave configured to execute the TEE-based application. Furthermore, the method includes attesting, by the EML application, the enclave configured to execute the TEE-based application and executing, by the enclave configured to execute the TEE-based application, the TEE-based application. The application parameters corresponding to the TEE-based application can include an application secret key, an expected measurement value of the TEE-based application, and an application deployment policy. The application secret key can be any secret used by the application service that the application owner wishes to bid from the cloud provider, the expected measurement value can be a hash of an application binary of the TEE-based application, and the application deployment policy can include an upper bound for a number of enclaves configured to run the TEE-based application.

The method can further include assigning, by the EML, application to the enclave configured to execute the TEE-based application, an enclave identifier. The method can also additionally include writing to the secure storage layer, enclave management parameters corresponding to the enclave configured to execute the TEE-based application. The enclave management parameters can include the enclave identifier, a shared session key, and a current end-of-lease timestamp. The snared session key is established during the attesting, by the EML application, the enclave configured to execute the TEE-based application.

The method can additionally include managing, by the EML application, the enclave configured to execute the TEE-based application. Managing the enclave configured to execute the TEE-based application can involve at least one of terminating, suspending, or resuming the enclave configured to execute the TEE-based application according to the enclave management parameters written to the secure storage layer.

The method can further Include creating, by the cloud computing system, a second enclave configured to execute the TEE-based application. The creating, by the cloud computing system, a second enclave configured to execute the TEE-based application can include fetching, by the EML, from the secure storage layer, the application parameters corresponding to the TEE-based application, determining, by the EML by using the application parameters corresponding to the TEE-based application, that a number of running enclaves configured to execute the TEE-based application is below the upper bound for the number of enclaves configured to run the TEE-based application, and securely transferring, by the EML, the application secret key to the second enclave by way of a shared secret key.

According to an embodiment of the invention, a non-transitory computer readable medium is provided having stored thereon instructions for carrying out a method for executing a trusted execution environment (TEE) based application in a cloud computing system. The method includes executing a proxied attestation procedure with a client to enable the client to attest that an enclave management layer (EML) application provided by the cloud computing system runs on a TEE-enabled platform. The method also Includes receiving, by the cloud computing system from the client, application code corresponding to the TEE-based application and receiving, by the EML application from the client, application parameters corresponding to the TEE-based application. In addition, the method includes writing, by the EML application to a secure storage layer, the application parameters corresponding to the TEE-based application and creating, by the cloud computing system, an enclave configured to execute the TEE-based application. Furthermore, the method includes attesting, by the EML application, the enclave configured to execute the TEE-based application and executing, by the enclave configured to execute the TEE-based application, the TEE-based application.

According to an embodiment of the invention, a system is provided for executing a trusted execution environment (TEE) based application in a cloud computing system. The system Includes a processor readable memory including a secure storage layer and one or more processors. The one or more processors are configured to execute a proxied attestation procedure with a client to enable the client to attest that an enclave management layer (EML) application provided by the cloud computing system runs on a TEE-enabled platform, receive application code corresponding to the TEE-based application, receive application parameters corresponding to the TEE-based application, write, to the secure storage layer, the application parameters corresponding to the TEE-based application, create an enclave configured to execute the TEE-based application, attest the enclave configured to execute the TEE-based application; and execute the TEE-based application.

FIG. 1 provides a model of a system according to an embodiment of the invention. In the model of the system depicted in FIG. 1, application owners (i.e. independent software vendors (ISVs)) entrust the cloud provider with the application code and entrust the EML with the secret material that the application needs to run (i.e. an application secret key). When a new application must be provisioned, the EML acts on behalf of the application owner and ensures that (i) the deployment of the new enclave does not violate the policy defined by the application owner, (ii) the application code runs in an enclave on an SGX-enabled platform, and (iii) the enclave is provisioned with the appropriate secret key, if required. When dealing with enclave decommissioning, it is generally not possible to determine whether an enclave has been properly shut down or whether Its messages are being blocked. To solve this issue, each application enclave can be granted a lease upon provisioning. That is, when the EML provisions an application enclave, it also provides an "end-of-lease" timestamp. The application enclave should run until the lease expires, unless the lease is otherwise renewed. Such granting of a lease is consistent with the existing billing models of most clouds where cloud users are billed at the end of an epoch.

As discussed above, IAS enables Intel to ensure that remote attestation is not abused by verifiers and, in particular, to ensure that SGX platforms are not tracked—which constitutes one of the primary goals of Direct Anonymous Attestation. Nevertheless, involving IAS as an intermediary in each remote attestation limits the adoption of this mechanism, especially by parties who are not registered with IAS. This limitation becomes especially relevant if an enclave runs a public service like a mail server, indeed, it is rather unrealistic to assume that all users interested in setting up a mail account are registered with IAS. Instead, users may want to attest the code of the mail server and ensure it runs in an enclave on an SGX-enabled platform. In order to overcome this limitation and enable remote attestation with unregistered verifiers, a proxy registered with IAS can be utilized. The proxy can be deployed by the cloud provider or by a third-party.

Figure 2:
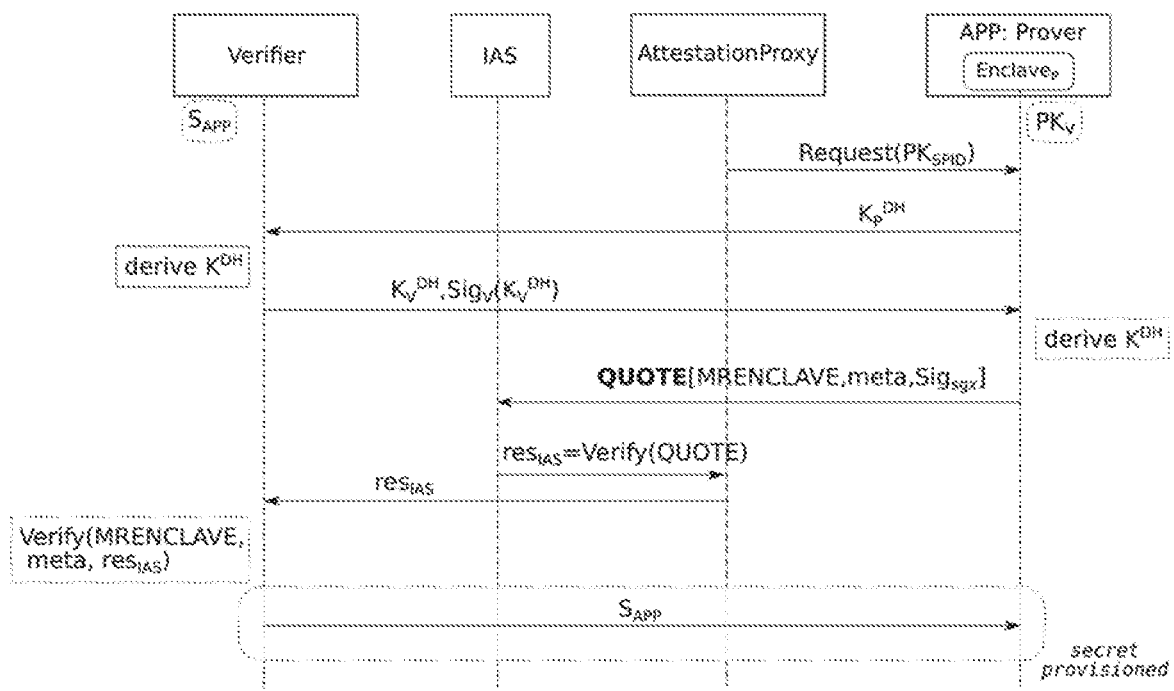
FIG. 2 is a data flow diagram depicting a proxied attestation protocol according to an embodiment of the invention.

FIG. 2 is a data flow diagram depicting a proxied attestation protocol according to an embodiment of the invention. In FIG. 2, only an overview of the protocol is provided. Detailed message contents refer to those defined in the Intel SGX SDK Developer Reference. The prover in the proxied attestation protocol is the application service, deployed to the cloud infrastructure and accompanied by one or more application enclaves (e.g. the prover enclave $Enclave_P$), that contains some application secrets that are not entrusted to the cloud. The verifier in the proxied attestation protocol is the application owner or a party delegated by the application owner, if the application owner is involved directly as the verifier in the proxied attestation process, then the EML along with the verifier enclave ($Enclave_V$) are not involved. However, in proxied attestation protocols according to embodiments of the invention, the EML (which includes the verifier enclave) is used to manage enclave provisioning, then the EML is delegated to be the verifier and, in order to attest the deployed application enclaves and provision the application secrets on behalf of the application owner, must involve a trusted component (i.e. the verifier enclave ($Enclave_V$)) in the remote attestation protocol, The flow diagram of FIG. 2 illustrates remote attestation, by a verifier (which can be, e.g., the verifier enclave $Enclave_V$ of the EML, though proxied attestation can also work without the EML being involved), of a prover enclave ($Enclave_P$) and provisioning of the application secret $S_{APP}$ to said prover enclave. In the remote attestation of FIG. 2, the verifier cannot remotely attest the prover enclave as it is not registered with the Intel Attestation Service (IAS). Only an attestation proxy is registered with IAS and is assigned with a service provider ID (SPID) along with the corresponding certificate issued by Intel. The flow diagram of FIG. 2 contemplates the scenario where the verifier is known to the prover so that the prover enclave $Enclave_P$ embeds (hard-codes in its enclave binary) the public key of the verifier $PK_V$. The proxy-based attestation protocol can be carried out according to the following steps:

1) On behalf of the verifier, the attestation proxy sends an attestation request (Request ($PK_{SPID}$)) to the prover. The request is forwarded to the prover enclave ($Enclave_P$).

2) Through a couple rounds of message exchange between the prover and the verifier and according to the remote attestation procedure supported by SGX trusted library, the verifier receives a Diffie-Hellman key component of the prover $K_P^{DH}$, and the prover receives the Diffie-Hellman key component of the verifier $K_V^{DH}$. The Diffie-Hellman key component of the verifier is accompanied with the verifier's signature $Sig_V(K_V^{DH})$. The prover uses the public key of the verifier $PK_V$ to verify the Diffie-Hellman key component of the verifier $K_V^{DH}$ based on the verifier's signature. Following the rounds of message exchange between the prover and the verifier, both the prover and the verifier have derived the shared credential $K^{DH}$ used to secure the communication channel between them.

3) The prover enclave ($Enclave_P$) generates the attestation quote QUOTE that includes a) MRENCLAVE which is the measurement result, e.g. a cryptographic hash value, of the prover enclave binary computed by the SGX platform during initialization of the prover enclave; b) meta which includes other metadata, e.g. the version number of the enclave, supplied by the SGX platform during the enclave Initialization, and c) $Sig_{EPID}$ which is the signature over the quote data under the attestation key provisioned inside each SGX platform. The signature is computed according to Enhanced Privacy ID (EPID), i.e. Intel's digital signature algorithm that provides anonymity.

4) The attestation quote QUOTE is sent to the Intel Attestation Service (IAS) via the proxy. An authenticated channel is thereby established between the attestation proxy and IAS given the SPID certificate issued by Intel to the attestation proxy during the registration stage.

5) IAS verifies the signature of the quote based on the stored EPID public key. IAS also checks whether the quote is generated by a legitimate SGX platform. The verification result $res_{IAS}$ signed by Intel is then sent back to the attestation proxy.

6) The proxy extracts the attestation result and forwards it to the verifier. The verifier checks the authenticity of $res_{IAS}$ given the trusted certificate or IAS, and further verifies whether the measurement of the prover enclave MRENCLAVE along with other metadata are correct.

7) If the attestation result is accepted, the verifier provisions the application secret $S_{APP}$ to the prover enclave $Enclave_P$ via a secure channel established based on the shared credential $K^{DH}$ generated in step 2).

In an alternative scenario, the verifier is unknown to the prover so the prover enclave $Enclave_P$ does not have the public key of the verifier $PK_V$ stored. In such alternative scenario, the proxy signs an ephemeral Diffie-Hellman (DH) key component $K_V^{DH}$ chosen by the verifier. In this case, the prover enclave must hard-code the public key of the proxy in the enclave binary.

Remote attestation using the standard SDK requires the ephemeral DH key of the prover to be signed and it also requires that the prover have the corresponding public key. In contrast, proxied attestation protocols according to embodiments of the invention allow any party to remotely attest an enclave and establish a unilaterally or mutually authenticated DM key—depending on whether the identity of the verifier is known to the prover. The proxied attestation protocols according to embodiments of the invention are compliant with the standard attestation protocol provided by Intel for SGX that leverages the SDK. The proxied attestation protocols also do not require application developers to update their code.

According to one or more embodiments of the invention, setting up the EML requires the cloud provider C (or a third party) to start N enclaves, each running an EML instance. The enclaves must attest each other and agree on a group key for secure group communication. For this task, each EML enclave is required to be aware of an identity of its peers (in order to attest them) and of the number N of enclaves that form the EML. Embodiments of the present invention can employ die group key exchange protocol described in M. Burmester and Y. Desmedt, "A secure and scalable group key exchange system," Inf. Process. Lett., vol. 94, no. 3, pp. 137-143, 2005. Embodiments of the present invention can also denote the established group key by $k_{EML}$. Attestation rules out active attacks and allows a passively secure group key agreement scheme to be used. That is, SGX attestation ensures that only an instance of the EML running in an SGX environment can participate in the key agreement protocol.

Once the EML has been set up, the enclaves jointly generate a key-pair for a signature scheme and publish the verification key. The verification key can be, e.g., the public key of the verifier $PK_V$ described above in connection with FIG. 2. Application owners must embed this key in their applications, in order to enable application enclaves to verity the legitimacy of the messages received from the EML during the provisioning process. The EML enclaves are organized in a Master-Slave approach. By default, the master enclave is the enclave that has the largest enclave identifier. During normal operation, the master is in charge of carrying out the main operations in the EML while the slaves simply assume a passive role.

The EML master implements a lightweight variant of the so-called "node guarding" protocol to keep track of the availability of the slaves. This essentially consists of the master exchanging alive messages with the slaves at regular intervals. The master enclave periodically sends a beacon request to the slaves to transmit information about their current state (e.g., stopped, active). If a slave does not response to the request of the master within a certain timeout, the master considers the slave to be crashed and relays this information to the remaining slaves. On the other hand, the slaves also use this protocol to monitor availability of the master. If a request from the master is not received after a certain timeout, the slaves assume that the master itself has failed. In this ease, the slave enclave having the largest enclave identifier (of the set of active slaves) assumes the role of master and begins sending beacon requests. This process ensures a continuous operation of the EML in spite of potential crash failures. The entire lightweight variant of the so-called "node guarding" protocol runs within the enclaves of EML nodes.

According to one or more embodiments of the invention, the EML assigns identifiers to applications and enclaves. An application and its binary (i.e. its compiled source code) can be denoted by $\alpha$ and $b_\alpha$, has respectively. A deployment policy defined by an application owner can be denoted by $p_\alpha$. It can be assumed the application owner sets an upper bound to the number of enclaves that cart run simultaneously. However, systems according to embodiments of the invention can easily be extended to account for more complex deployment policies, for example deployment policies that specify how often leases should be renewed, in what locations new enclaves should be instantiated, etc. An identifier for an enclave of application $\alpha$ can be denoted by $\alpha\|mr_\alpha\|h_\alpha$, where $mr_\alpha$ is the MRENCLAVE (i.e. the integrity measurement result of the application enclave computed by the SGX platform during initialization of the enclave) of the application, and $h_\alpha$ corresponds to the hash of the key established between the EML and the enclave during attestation.

According to one or more embodiments of the invention, the EML leverages a Byzantine Fault-Tolerant (BFT) storage layer (BSL) that provides consistent storage despite Byzantine faults of some fraction of its nodes. FIG. 3 depicts storage of information for an application according to an embodiment of the invention. Application identifiers can be used as keys for the storage service and for each application a "flat" database can be used to store information pertaining to that application and its enclaves. For each application the EML keeps track of the following metadata:

i. $p_\alpha$: the upper bound of the number of running enclaves
ii. $mr_\alpha$: MRENCLAVE
iii. $ak_\alpha$: the application secret key
iv. $enc_\alpha$: the list of tuples (eid, key, st, eol) where eid is an enclave identifier, key is the key established between EML and the enclave during attestation, st is a status variable, and eol is the current end-of-lease timestamp for that enclave.

Variable st can take values in {att, run, tbd, tbs, sus}. An enclave has status "attested" (att) after being attested by EML. The status is changed to "running (run) when the enclave is provisioned with the application secret key. The enclave status is set to "to be deleted" (tbd) or "to be suspended" (tbs) when the cloud requests the enclave be deleted or suspended, respectively. Finally the status is set to "suspended" (sus) when the enclave has been suspended.

The EML exports the identifiers of applications and enclaves to the cloud C in order to efficiently manage enclaves for a given application. Application and enclave identifiers do not bear any sensitive information apart from the number of enclaves running for a given application—which is information already available to the cloud. Unless otherwise specified, the integrity and the confidentiality of values that are written/read to the BSL (via PUT/GET) are protected by means of an authenticated encryption scheme. The key material for authenticated encryption is derived from the group key shared by all EML enclaves, namely $k_{EML}$, by way of a key-derivation function.

The PUT/GET interface according to embodiments can be described as follows, GET($\alpha$; attr) is written to fetch only the value of attribute attr for application $\alpha$. Similarly, PUT($\alpha$; attr:=value) is written to set attr to value, leaving all other attributes of the same key unchanged. GET($\alpha$; $enc_a$; eid) is written to fetch only the enclave information related to eid (i.e., key, st, eol) from the list $enc_\alpha$. Also, PUT($\alpha$; $enc_\alpha$; ⟨eid',key',st', eol⟩ is written to the list of enclaves $enc_\alpha$ of application $\alpha$. If $enc_\alpha$ already has a tuple with eid==eid', this operation only updates the remaining fields to key', st', and eol', respectively. If $enc_\alpha$ has no tuple with eid==eid', then a new tuple ⟨eid', key', state', eoi'⟩ is appended. The foregoing description of the PUT/GET interface is used herein only to improve the readability of the following pseudocode, while in reality, the entire data associated with a given key is always read and written.

According to one or more embodiments of the invention, an application owner can upload an application to the cloud using a process represented by the following pseudocode.

---

Algorithm 1 Attestation of the EML Service and Initial Upload of Code

```
1: [APPLICATION OWNER]
2: function ATTEST-UPLOAD
3:     k ← PROXIEDATTESTATION(e_EML, mr_EML)
4:     if k == ⊥ then
5:         return −1
6:     end if
7:     SEND⟨p_α, mr_α, ak_α⟩ to e_EML
8:     SEND⟨b_α⟩ to C
9: end function
10: [EML]
11: function INITIALIZE(α, p_α, mr_α, ak_α)
12:     PUT(α: p_α, mr_α, ak_α, ⊥)
13: end function
```

---

Before the application owner can entrust the management of his application to the EML, the application owner must verify the identity of the EML enclave and establish a secure channel. This is captured by the function PROXIEDATTES- TATION($e_{EML}$, $mr_{EML}$) that takes as input the endpoint of the enclave to be attested (i.e. $e_{EML}$—the IP address of the EML service enclave or some other identity of the EML service enclave sufficient to enable the application owner to establish a connection for attestation) and the expected MRENCLAVE. The enclave to be attested corresponds to the prover enclave (Enclave$_P$) discussed above in connection with FIG. 2. The EML enclave is first verified (i.e. by the prover) by the application owner. Then if the verification is successful, it is delegated by the application owner and becomes the verifier to verify the other (user) application enclaves. In short, in algorithm 1, the application owner is the verifier and the EML enclave is the prover Enclave$_P$; in algorithm 2, EML enclave is the verifier Enclave$_V$ and the application enclave is the prover Enclave$_P$.

As explained above, the function returns the key k established with the prover enclave, if attestation is successful. Otherwise the function signals an error by returning ⊥. Once the application owner has established a secure channel with the EML, the application owner can upload pα, mrα, akα to EML, and bα to C. The EML writes $p_\alpha$, $mr_\alpha$, $ak_\alpha$, ⊥, to the BSL and sends an acknowledgement to the application owner. The cloud stores $b_\alpha$ and also sends an acknowledgement message to the application owner. From this moment on, the application owner can go offline, while the EML cooperates with C in order to increase or decrease the number of enclaves allocated to the application. C can, at any time, issue requests to EML to deploy or remove an enclave. Similarly, C can ask to suspend a running enclave or resume a previously suspended enclave. EML writes requests to storage in order to serialize them. Then, EML periodically reads from BSL in order to identity pending requests and dispatch them.

As discussed herein, an enclave is an application binary. The application source code is programmed in such a way that it will be compiled to an enclave. The term "application," whether application service or application enclave, denotes "user application," which serves a specific functionality and is deployed on the cloud platform to provide certain services to the users. A (user) application enclave contains the sensitive part of an application service, for example, generating password for users, depending on what kind of service. The EML enclave serves the purpose of assisting the cloud to manage the lifecycle of a provisioned (user) application enclave, no matter what (user) application services it supports.

Figure 4:
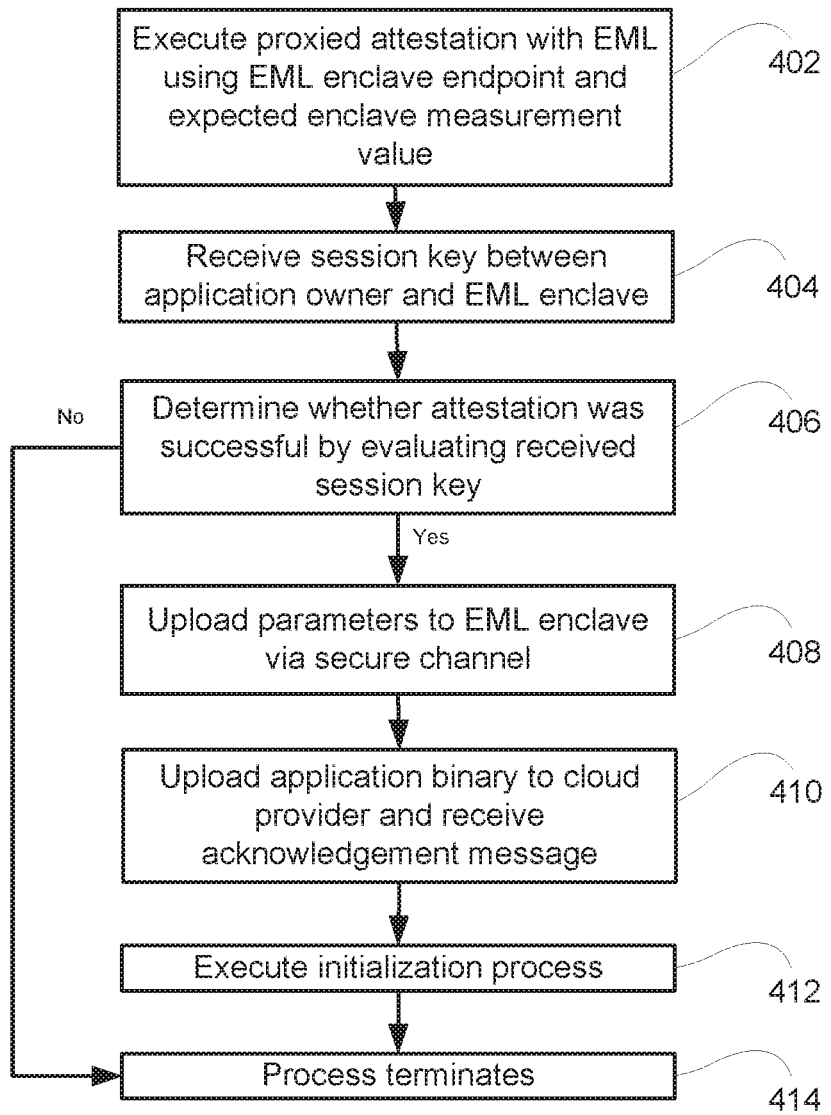
FIG. 4 is a flow diagram illustrating a process according to an embodiment of the invention for unloading an application to the cloud.

FIG. 4 is a flow diagram illustrating a process according to an embodiment of the invention for uploading an application to the cloud. At 402, the application owner executes a proxied attestation with the EML according to a proxied attestation protocol using the endpoint $e_{EML}$ of the of EML enclave and the expected enclave measurement value $mr_{EML}$. At 404, the application owner receives a session key k between the application owner and the EML enclave. At 406, the application owner determines whether the attestation was successful by evaluating the received session key k. If the session key k is null, the attestation was not successful and the EML initialization process terminates with an error code at 414. If the session key k is not null, the process proceeds to 408 where the application owner uploads, to the endpoint $e_{EML}$ of the of EML enclave via the secure channel established with the EML using the session key k, the maximum number of running enclaves for the application service $p_\alpha$, the expected measurement value of the application service $mr_\alpha$, and the application secret key $ak_\alpha$. The process then proceeds to 410 where the application owner uploads the application binary to the cloud provider C and receives an acknowledgement message that the cloud provider C has stored the application binary. At 412, the EML executes an initialization process whereby the EML writes, to the BSL, an application ID α, the maximum number of running enclaves for the application service $p_\alpha$, the expected measurement value of the application service $mr_\alpha$, and the application secret key $ak_\alpha$. At 414, the process terminates.

According to one or more embodiments of the invention, the cloud provider C can create a new enclave e on an SGX platform, load the code $b_\alpha$, and then contact the EML enclave that is acting as master to trigger the attestation and provisioning of the enclave by using a process represented by the following pseudocode.

---
Algorithm 2 Deployment Request

```
1: function PROVISION_REQUEST(α, e)
2:     mr_α ← GET(α; mr_α)
3:     k_{α,EML} ← PROXIEDATTESTATION(e, mr_α)
4:     if k_{α,EML} == ⊥ then
5:         return -1
6:     end if
7:     h_α ← H(k_{α,EML})
8:     eid ← α||mr_α||h_α
9:     PUT(α; enc_α :⟨eid, k_{α,EML}, att, ⊥⟩)
10:    SEND(ack, α, e, eid) to C
11: end function
```
---

Upon receiving a request, the EML enclave attests the application enclave (line 3) and assigns it an identifier made of the application identifier, the enclave identity, and the hash of the key established with that enclave during attestation (line 8). Next, the EML enclave writes to storage tuple ⟨eid, $k_{\alpha,EML}$, att, ⊥⟩ to reflect the fact that enclave eid was attested and it is ready for provisioning. Finally, the EML enclave acknowledges to C the end of the operation, if C does not receive an acknowledgement within a given timeout, then C may infer that the EML enclave handling the request has crashed and that the request should be issued to another EML enclave.

Figure 5:
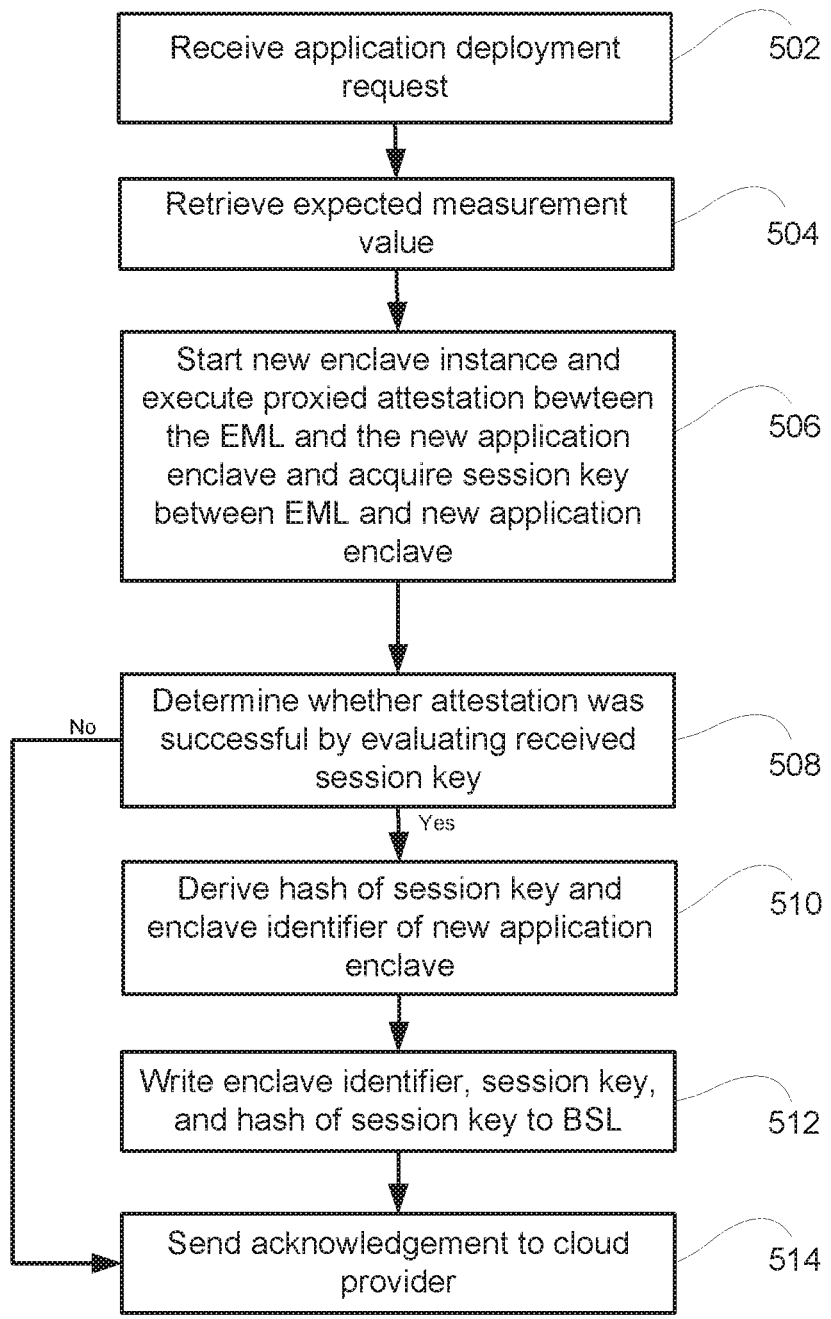
FIG. 5 is a flow diagram illustrating a process according to an embodiment of the invention for creating a new enclave on an SGX platform, loading code corresponding to an application, and triggering the attestation and provisioning of the new enclave.

FIG. 5 is a flow diagram illustrating a process according to an embodiment of the invention for creating a new enclave on an SGX platform, loading code corresponding to an application, and triggering the attestation and provisioning of the new enclave. At 502, the EML receives a request for deployment of an application (with application ID α) from the cloud of a newly instantiated enclave with endpoint e. At 504, the EML retrieves the expected measurement value $mr_\alpha$ of the requested application enclave. At 506, a new enclave instance is started and the EML executes a proxied attestation with the new application enclave according to a proxied attestation protocol using the endpoint e of the application enclave to be attested (the new application enclave) and the expected enclave measurement value $mr_\alpha$ of the new application enclave. At 506, the EML also acquires a session key $k_{\alpha,EML}$ between the EML and the new application enclave. At 508, the EML checks whether the attestation was successful by evaluating the received session key $k_{\alpha,EML}$. If the session key $k_{\alpha,EML}$ is null, the attestation was not successful and the process terminates with an error code at 516. If the session key $k_{\alpha,EML}$ is not null, the process proceeds to 510 where the EML derives the hash $h_\alpha$ of the session key $k_{\alpha,EML}$ and an enclave identifier of the new application enclave eid. The enclave identifier eid is composed of the application ID α, the expected measurement value $mr_\alpha$ of the new application enclave, and the hash $h_\alpha$ of the session key $k_{\alpha,EML}$. The process then proceeds to 512 where the EML writes to the BSL the enclave identifier eid, the session key $k_{\alpha,EML}$, and an initial enclave state attested att. At 514, the EML sends an acknowledgement to the cloud provider C that the new application enclave has been successfully provisioned. The acknowledgment includes the identifier eid of the new application enclave.

According to one or more embodiments of the invention, an enclave can be terminated, suspended, or resumed by processes represented by the following pseudocode.

---
Algorithm 3 Termination Request
---
1: function TERMINATE_REQUEST(eid)
2:    Parse eid as $\alpha \| mr_\alpha \| h_\alpha$
3:    (key, st, eol) ← GET($\alpha$; eid)
4:    if st == run then
5:       PUT($\alpha$; $enc_\alpha$:⟨eid , key,tbd, eol⟩)
6:    end if
7:    SEND(ack, tbd, eid) to C
8: end function ---
Algorithm 4 Suspension Request
---
1: function SUSPENSION_REQUEST(eid)
2:    Parse eid as $\alpha \| mr_\alpha \| h_\alpha$
3:    (key, st, eol) ← GET($\alpha$; eid)
4:    if st == run then
5:       PUT($\alpha$; $enc_\alpha$ :⟨eid , key, tbs, eol⟩)
6:    end if
7:    SEND(ack, tbs, eid) to C
8: end function ---
Algorithm 5 Resumption Request
---
1: function RESUMPTION_REQUEST(eid)
2:    Parse eid as $\alpha \| mr_\alpha \| h_\alpha$
3:    (key, st, eol) ← GET($\alpha$; eid)
4:    if st == sus then
5:       PUT($\alpha$; $enc_\alpha$ :⟨eid , key, tbr, eol⟩)
6:    end if
7:    SEND(ack, tbr, eid) to C
8: end function Requests can be invoked by C providing the enclave identifier eid as an argument. The EML enclave handling a request extracts the application identifier from eid and fetches attributes key, st, eol of enclave eid from the BSL. For enclave termination, the EML enclave checks that st is "run" and sets it to "tbd" (i.e., to be deleted). For enclave suspension, the EML enclave checks that si is "run" and sets it to "tbs" (i.e., to be suspended). For enclave resumption, the EML enclave checks that st is "sus" and sets it to tbr (i.e., to be run). For termination and suspension of an enclave, EML only takes note of the request by setting the status variable of that specific enclave; the operation is actually completed at the beginning of the next lease. This is because, as discussed above, there is no guarantee that the cloud is effectively terminating or suspending the enclave at the time of the request. However, the enclave will stop working at the end of the current lease and its lease will not be renewed as shown below. For enclave resumption, once again the EML persists the request to storage by setting the status variable of that specific enclave; the enclave will be resumed by the main routine of the EML, that dispatches provisioning and resumption requests persisted to storage.

Figure 6:
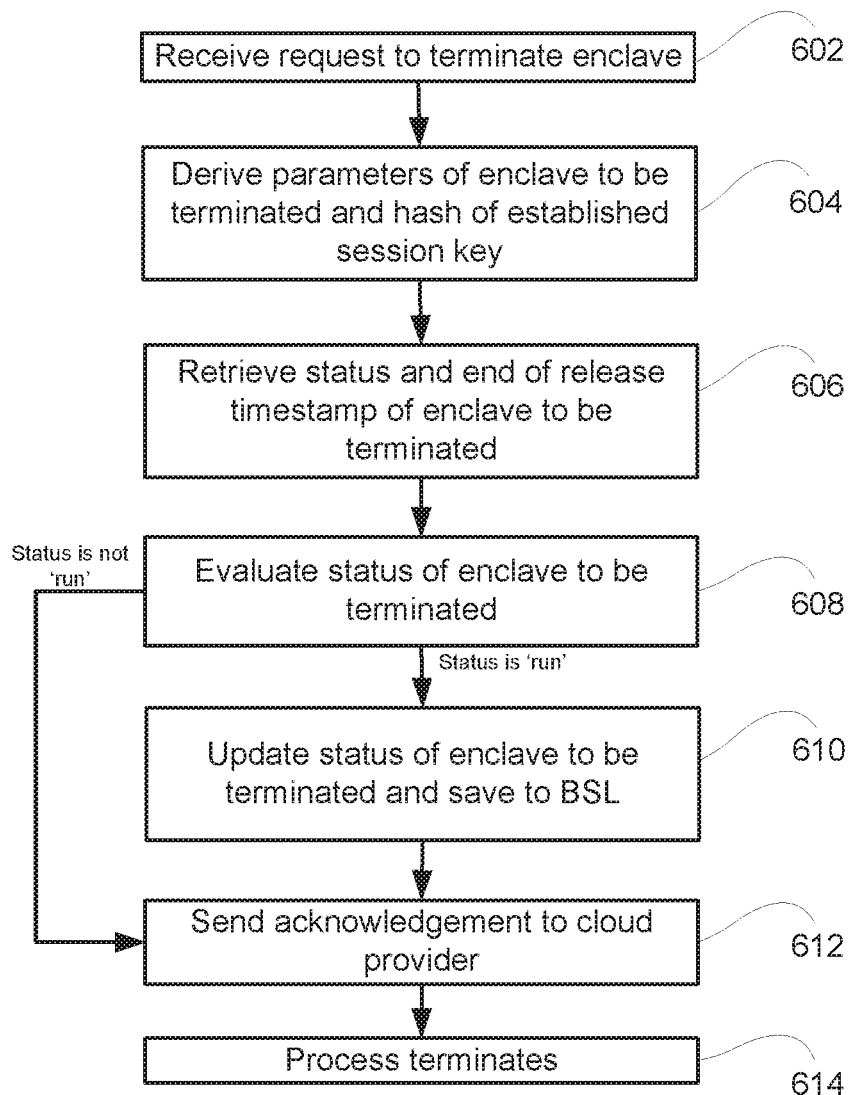
FIG. 6 is a flow diagram illustrating a process according to an embodiment of the invention for terminating an enclave.

FIG. 6 is a flow diagram illustrating a process according to an embodiment of the invention for terminating an enclave. At 602, the EML receives a request to terminate an enclave. The request includes the identifier eid of the enclave to be terminated. At 604, the EML derives, by parsing the eid, the application ID $\alpha$, the expected measurement value $mr_\alpha$ of the enclave to be terminated, and the hash $h_\alpha$ of the session key key established between the EML and the enclave to be terminated. At 606, the EML retrieves, from the BSL, the session key key, the status of the enclave to be terminated st, and the end of release timestamp eol of the enclave to be terminated. At 608, the EML evaluates the status of the enclave to be terminated. If the status of the enclave to be terminated is 'run,' the EML updates the status to be 'tbd' and saves it to the BSL at 610. Otherwise, the process proceeds directly to 612 where the EML sends an acknowledgement to the cloud provider C. The acknowledgement includes the eid of the enclave to be terminated. At 614, the process ends.

Figure 7:
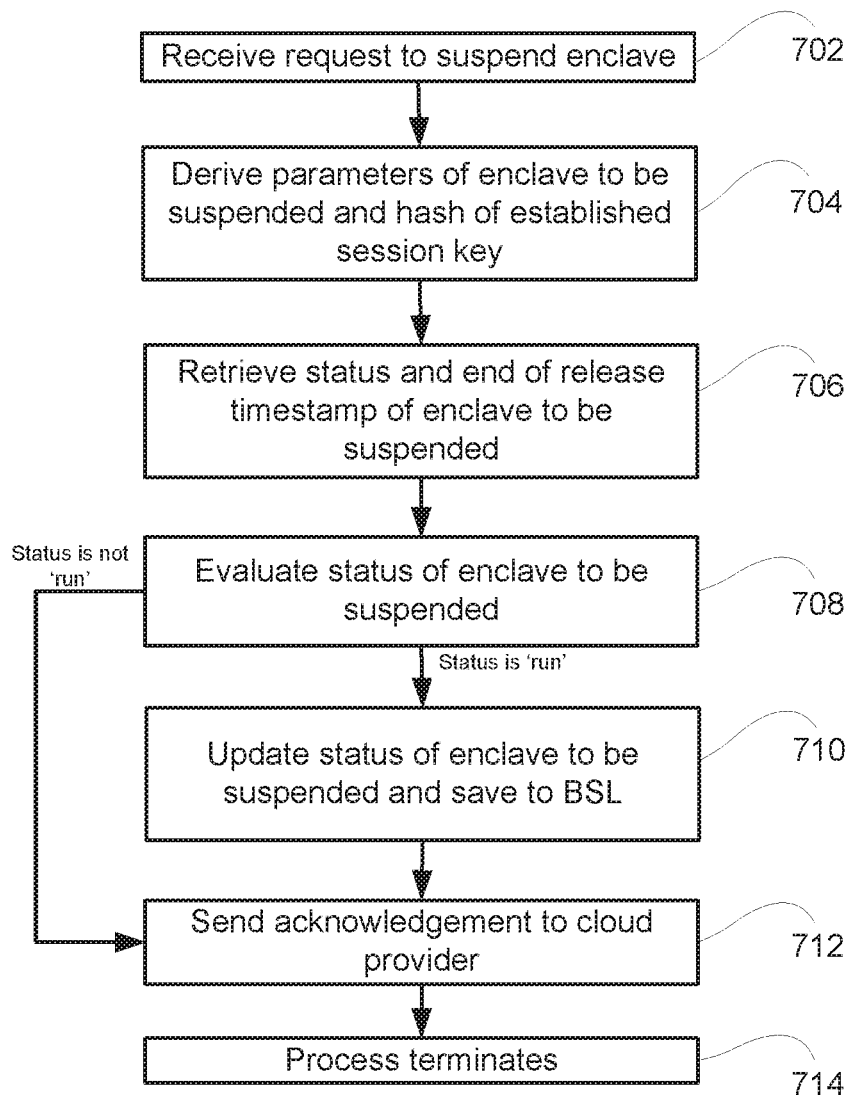
FIG. 7 is a flow diagram illustrating a process according to an embodiment of the invention for suspending an enclave.

FIG. 7 is a flow diagram illustrating a process according to an embodiment of the invention for suspending an enclave. At 702, the EML receives a request to suspend an enclave. The request includes the identifier eid of the enclave to be terminated. At 704, the EML derives, by parsing the eid, the application ID $\alpha$, the expected measurement value $mr_\alpha$ of the enclave to be suspended, and the hash $h_\alpha$ of the session key key established between the EML and the enclave to be suspended. At 706, the EML retrieves, from the BSL, the session key key, the status of the enclave to be suspended st, and the end of release timestamp eol of the enclave to be suspended. At 708, the EML evaluates the status of the enclave to be suspended. If the status of the enclave to be suspended is 'run,' the EML updates the status to be 'tbs' and saves it to the BSL at 710. Otherwise, the process proceeds directly to 712 where the EML sends an acknowledgement to the cloud provider C. The acknowledgement includes the eid of the enclave to be suspended. At 714, the process ends.

Figure 8:
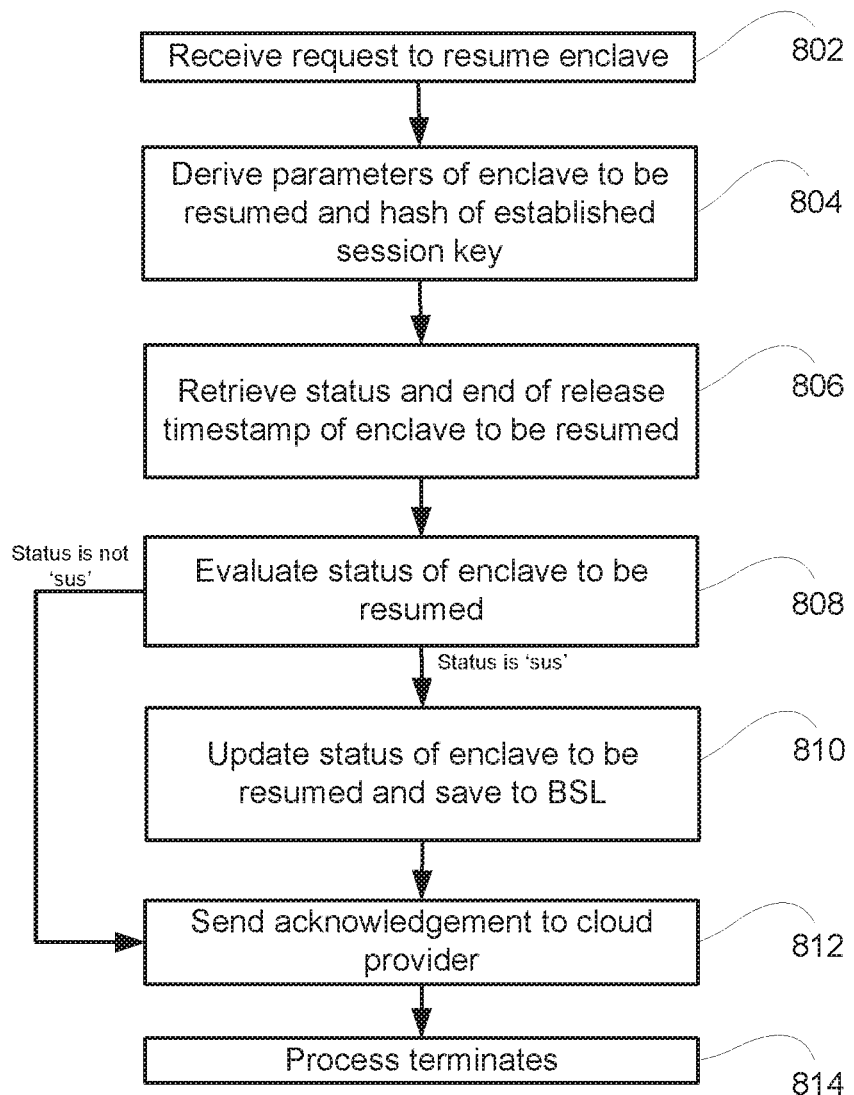
FIG. 8 is a flow diagram illustrating a process according to an embodiment of the invention for resuming operation of an enclave.

FIG. 8 is a flow diagram illustrating a process according to an embodiment of the invention for resuming operation of an enclave. At 802, the EML receives a request to resume operation of an enclave. The request includes the identifier eid of the enclave to be resumed. At 804, the EML derives, by parsing the eid, the application ID $\alpha$, the expected measurement value $mr_\alpha$ of the enclave to be resumed, and the hash of the session key key established between the EML and the enclave to be resumed. At 806, the EML retrieves, from the BSL, the session key key, the status of the enclave to be resumed st, and the end of release timestamp eol of the enclave to be resumed. At 808, the EML evaluates the status of the enclave to be resumed. If the status of the enclave to be resumed is 'sus,' the EML updates the status to be 'tbr' and saves it to the BSL at 810. Otherwise, the process proceeds directly to 812 where the EML sends an acknowledgement to the cloud provider C. The acknowledgement includes the eid of the enclave to be resumed. At 814, the process ends.

According to one or more embodiments of the invention, requests to provision or resume enclaves can be dispatched according to a process represented by the following pseudocode.

---
Algorithm 6 Dispatch
---
1: function RUN($\alpha$)
2:    ⟨$p_\alpha$, $mr_\alpha$, $ak_\alpha$, $enc_\alpha$⟩ ← GET($\alpha$)
3:    ⟨eid, key, st, eol⟩ ← FINDNEXT($enc_\alpha$)
4:    if eid! = ⊥ then

Algorithm 6 Dispatch

```
 5:        if COUNTRUNNING(enc_α) < p_α then
 6:            if st == att then
 7:                SEND(ak_α, eol) to eid
 8:            else                    ▷ st == tbr
 9:                SEND(resume, eol) to eid
10:                PUT(α;⟨eid, key, run, eol⟩)
11:            end if
12:            SEND(ack, run, eid) to C
13:        end if
14:    end if
15: end function
```

Processes for dispatching requests to provision or resume enclaves are periodically executed by the EML enclave acting as master. Function FINDNEXT(enc$_\alpha$) on line 3 takes as input the list of tuples and returns the first tuple ⟨eid, key, st, eol⟩ such that the status variable st is either "att" or "tbr." Status "att" means that the enclave has been attested and it is ready to be provisioned with the application secret key. Status "tbr" reflects a suspended enclave that must be resumed. Before dispatching the request for eid, the EML enclave checks that the number of running enclaves is below the upper bound set by application owner and that provisioning/resuming eid does not violate the owner's constraints. Counting is carried out by function COUNTRUNNING(enc$_\alpha$) on line 5. An enclave is considered as running if its status variable is set to "running, "to be suspended", or "to be deleted." Next, the EML enclave either provisions eid with the application secret key and the current end-of-lease timestamp, or it sends to eid a "resume" directive with the current end-of-lease timestamp. Finally, the EML writes to the BSL that the enclave has been served and notifies C.

Figure 9:
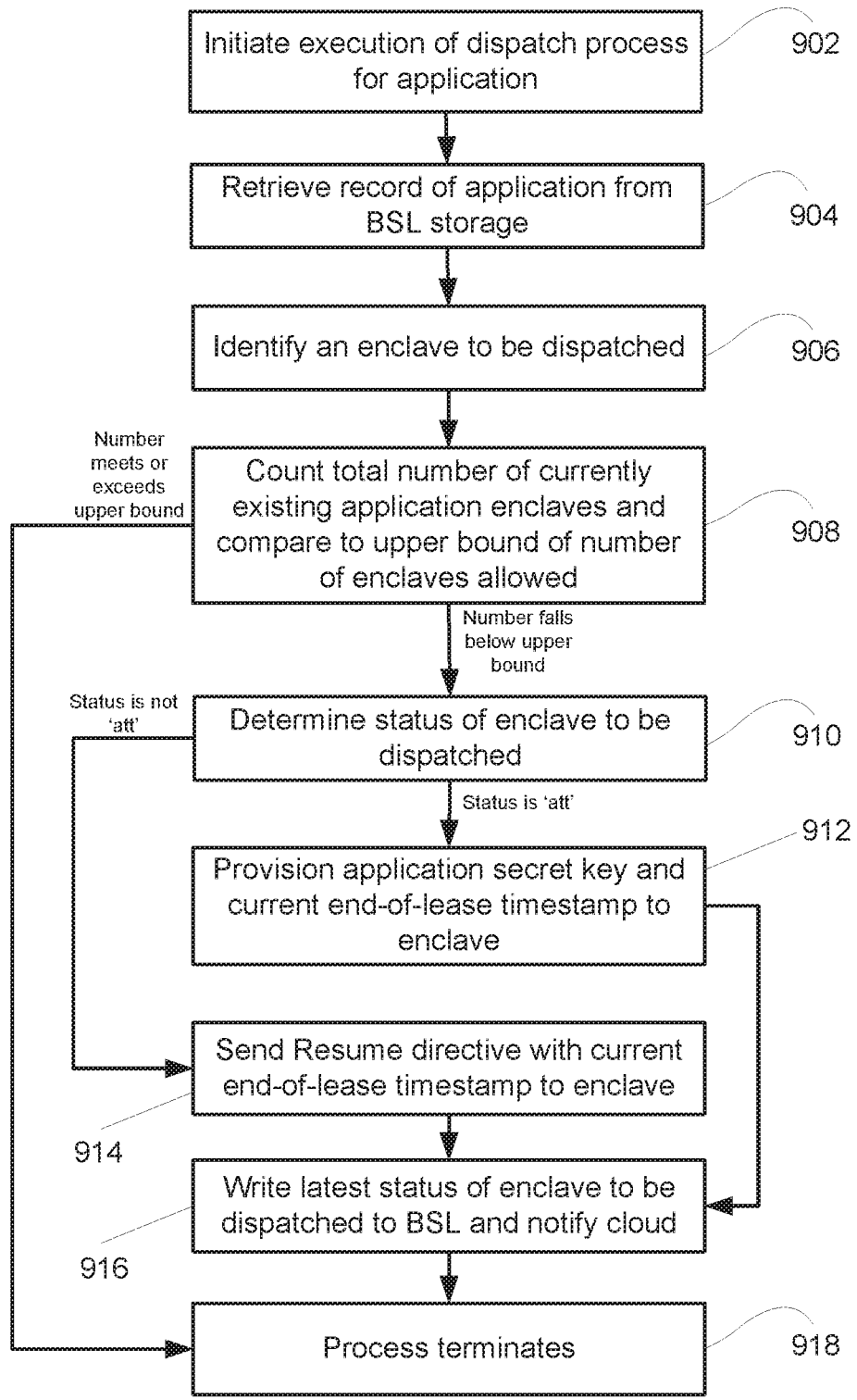
FIG. 9 is a flow diagram illustrating a process according to an embodiment of the invention by which requests to provision or resume enclaves can be dispatched.

FIG. 9 is a flow diagram illustrating a process according to an embodiment of the Invention by which requests to provision or resume enclaves can be dispatched. At 902, the EML enclave acting as the master EML enclave initiates execution of a dispatch process for an application α. Such dispatch processes can be initiated periodically by the enclave acting as the master EML enclave. At 904, the EML retrieves the record of the application from BSL storage. The record of the application includes the deployment policy defined by the application owner the expected measurement value mr$_\alpha$ of an enclave running the application, the application secret key ak$_\alpha$, and the list of enclaves enc$_\alpha$ relevant to application α. At 906, the EML identifies an enclave to be dispatched. The enclave to be dispatched is an application enclave whose status is either 'att' (attested) or 'tbr' (to be run). At 908, the EML counts the number of the application enclaves whose status is either 'run,' 'tsp,' or 'tbd.' If the counted number of enclaves exceeds the upper bound of enclaves allowed according to the deployment policy defined by the application owner, the process proceeds directly to 918 where the process is terminated. However, if the counted number of enclaves does not exceed the upper bound of enclaves, the process proceeds to 910 where the EML determines the status of the enclave to be dispatched. If the status of the enclave to be dispatched is 'att,' the EML provisions the application secret key and the current end-of-lease timestamp eol to the enclave at 912. Otherwise, the EML sends a "resume" directive with the current end-of-lease timestamp to the enclave at 914. Thereafter, the process proceeds to 916 where the EML writes to the BSL the latest status (i.e., 'run') of the enclave to be dispatched and notifies the cloud. At 918, the process terminates.

According to one or more embodiments of the invention, lease renewal can be performed by the EML enclave acting as master by executing a process represented by the following pseudocode.

Algorithm 7 Lease Renewal

```
 1: function RENEW(α)
 2:     ⟨p_α, mr_α, ak_α, enc_α⟩ ← GET(α)
 3:     for ⟨eid, key, st, eol⟩ in enc_α do
 4:         if st == tbs then
 5:             PUT(α; ⟨eid, key, sus, eol⟩)
 6:         else if st == tbd then
 7:             DELETE(enc_α, eid)
 8:         else if st == run && eol < eol' then
 9:             SEND(renew, eol') to eid
10:             PUT(α; enc_α:⟨eid, key, run, eol'⟩)
11:         end if
12:     end for
13: end function
```

Processes for lease renewal are run by the EML enclave acting as master when a current end-of-lease timestamp is approaching. At this stage, the EML enclave scans through the list of enclaves belonging to application α and checks their status in order to determine whether the application enclave must be suspended (line 4-5), deleted (lines 6-7), or whether its lease must be renewed. In the latter case, the application enclave receives the new end-of-lease timestamp eol' with a "renew" directive. Regardless of the operation, the EML enclave pushes the changes to BSL in order to persist the fact that the request was handled. Note that function DELETE(enc$_\alpha$, eid) on line 7 removes from enc$_\alpha$ the tuple referring to eid and writes the updated list of tuples to storage.

Figure 10:
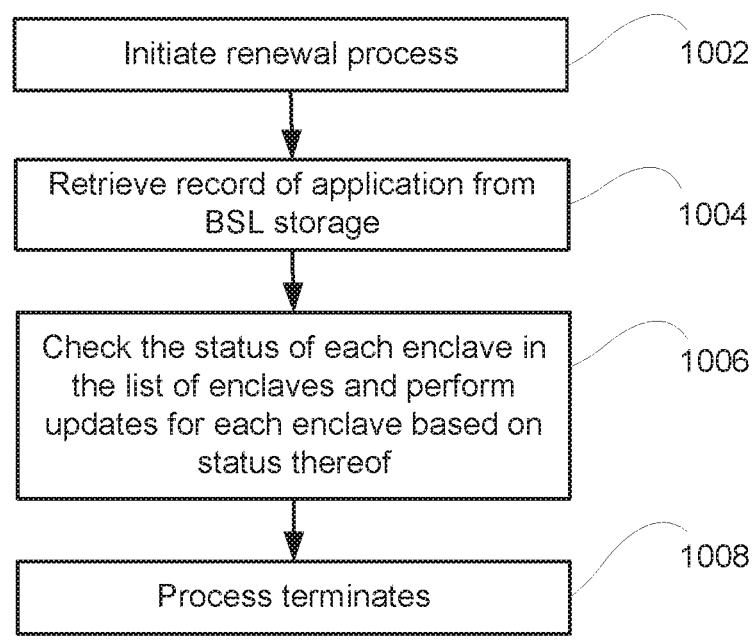
FIG. 10 is a flow diagram illustrating a lease renewal process according to an embodiment of the invention.

FIG. 10 is a flow diagram illustrating a lease renewal process according to an embodiment of the invention. At 1002, the EML enclave acting as the master EML enclave initiates a renewal process for the application α. Such renewal processes can be initiated periodically by the enclave acting as the master EML enclave. At 1004, the EML retrieves the record of the application from BSL storage. The record of the application includes the deployment policy defined by the application owner p$_\alpha$, the expected measurement value mr$_\alpha$ of an enclave running the application, the application secret key ak$_\alpha$, and the list of enclaves enc$_\alpha$ relevant to application α. At 1006, the EML checks the status of each enclave in the list of enclaves enc$_\alpha$ relevant to application α and performs updates for each of the enclaves based on the respective status thereof. Specifically, if the status of a respective enclave is 'tbs' (to be suspended), the EML updates the status of the respective enclave to 'sus' and stores the updated status in the BSL. If the status of the respective enclave is 'tbd' (to be deleted), the EML deletes the record of the corresponding application enclave in the BSL. If the status of the respective enclave is 'run' and the last end-of-lease timestamp has expired, then the EML sends a new end-of-lease timestamp with a 'renew' directive to the application enclave and updates the new end-of-lease timestamp for the application enclave in the BSL. At 1008, the process terminates.

In general, it can be assumed that an application enclave does not need to maintain any application-specific state. However, in some cases, applications need to keep, e.g., a user-specific state to ensure its correct operation. In this case, newly provisioned enclaves should maintain a consistent view of such a state—otherwise the security of the overall service could be compromised. For example, in secure network function visualization (S-NFV), an adversary could run two separated instances of an application and route state updates only to one in-stance, while exclusively pushing traffic flows to other instances. Hence, the outcome of processing a given flow may be different and dependant on whether it is carried out by one instance or the other. Similarly, password-strengthening services like Safekeeper, described by K. Krawiecka, A. Kurnikov, A. Paverd, M. Mannan, and N. Asokan, "Protecting web passwords from rogue servers using trusted execution environments," in International Conference on World Wide Web, 2017, pp. 1-16., rely on rate-limiting to keep passwords secret. Having access to multiple isolated application instances, allows an adversary to circumvent restrictions imposed by rate-limiting policies.

Systems according to one or more embodiments of the invention can inherently overcome such limitations by leveraging Byzantine-fault tolerant storage layer. Namely, whenever needed, authorized applications in ReplicaTEE can write/read their latest state from a storage layer using the standard offered PUT/GET interface. That is, the storage layer acts as consistent storage medium for various application enclaves to synchronize their latest application state. For example, an enclave emulating password strengthening can continuously write the number of trials attempted on the storage layer. This allows rate-limiting to be enforced across all application enclaves running the same service.

As mentioned above, systems according to one or more embodiments of the invention assume an adversary that can compromise, for a particular application, up to t storage nodes and all nodes that run the application. However, the adversary cannot compromise application enclaves since SGX ensures unhampered execution of enclaves arid, by leveraging sealing, also guarantees that enclave data remains confidential even across reboots of a host machine. On the other hand, even if the adversary compromises up to t storage nodes, it cannot impact consensus realization in the storage layer. For example, the MinBFT protocol tolerates up to t Byzantine nodes while ensuring safety (all non-faulty storage nodes execute the requests in the same order, i.e., realize consensus) and liveness (all clients, i.e. EML enclaves, eventually receive replies to their requests.

In more details, MinBFT includes four different routines. In the Request routine, clients send their request messages asking replicas to execute certain operations. For example, a client C prepares requested operation op in message $\langle \text{REQUEST}, C, seq, op \rangle \sigma_C$, where seq records the (local) message sequence from each client to prevent re-execution of the operations, and $\sigma_C$ is the client signature. In the Prepare routine, which is triggered when a primary node receives a request message m, the request is validated and the primary node asks its TEE to generate a unique identifier $UI_p = \langle c, m \rangle \sigma_p$ for the message. The counter c is monotonically increasing and the signature $\sigma_p$ is from the TEE. Subsequently, $S_p$ multi-casts $\langle \text{PREPARE}, v, S_p, m, UI_p \rangle$ to the other replicas. In the Commit routine, which serves to acknowledge a valid PREPARE message, each replica $S_i$ responds with a COMMIT message and multicasts $\langle \text{COMMIT}, v, m, S_i, UI_i, S_p, UI_p \rangle$ to the other nodes, where $UI_i$ is a unique identifier that $S_i$ gets from its TEE. In the Reply routine, a request is committed locally and can be executed once a replica has received enough, i.e. (f+1), consistent commits, thereby ensuring that any request that commits locally on a correct replica will be committed on at least f+1 correct replicas eventually. Therefore, the replica can execute the operation op and send the reply $\langle \text{REPLY}, \mathscr{S}_i, seq, res \rangle$ with the execution result res back to the client.

In addition, MinBFT allows for view change procedures that allow replacement of a primary node at the request of a replica node when that primary node is suspected to be misbehaving. More specifically, when a received request fails to be executed within a certain timeout a replica can issue a view-change request $\langle \text{REQ-VIEW-CHANGE}, \mathscr{S}_i, v, v' \rangle$ to the other replicas, where v' is the new view number and v'=v+1. If a replica receives f+1 REQ-VIEW-CHANGE, it moves to view v' and multicasts message $\langle \text{VIEW-CHANGE}, \mathscr{S}_i v', CP, O, UI_i \rangle$, where CP is the latest certificate and O is the set of all messages sent by the replica since CP. Once the new primary of view v' received f+1 valid VIEW-CHANGE messages with a consistent system state, the view change is executed by the new primary who broadcasts $\langle \text{NEW-VIEW}, \mathscr{P}', v', Vvc, s, UI_p' \rangle$, where Vvc is the view-change certificate that includes all the received VIEW-CHANGE messages, and s is the current system state which will serve as the initial state of view v'. The correctness of MinBFT holds as long as there is at least one honest node involved in any two quorums, thus only 2f+1 replicas are required to tolerate/faulty nodes.

In order to thwart attacks from a rational cloud, one must ensure that (i) the EML's log of the enclaves belonging to an application, namely $nc_\alpha$, reflects at all times the number and status of application enclaves deployed on C, and (ii) that the number of "running" enclaves in $enc_\alpha$ is compliant with the policy defined by the application owner. Naturally, the confidentiality of the application secret key must be maintained throughout the application lifecycle.

Systems according to one or more embodiments of the invention ensure that the EML's log of the enclaves belonging to an application reflects at all times the number and status of application enclaves deployed on C by providing secure enclave provisioning. Systems according to embodiments of the invention allow the owner of an application $\alpha$ to securely provision application enclaves by using the EML service. In line with current SGX deployment models, the only piece of information required to be treated as sensitive is the application secret key $k_\alpha$, whereas the application binary can be treated as non-sensitive data.

Before transferring the secret key of an application to the EML, an application owner must attest the EML enclave and establish a secret key. This can done by leveraging a proxied attestation protocol, such as that described above and shown in FIG. 2. Note that during key establishment, the EML enclave cannot attest the application owner (since the two parties may have not had any previous interaction). Therefore, the EML accepts application metadata (i.e., the application secret key, the policy, etc.) from any party. Nevertheless, it can be assumed that the cloud service provider C can authenticate application owners and that only authenticated application owners can contact the EML. This is a reasonable assumption since C must authenticate application owners in order to bill them.

Once an application owner has securely uploaded the secret application key $\alpha k_\alpha$ to the EML, the security provisions of SGX guarantee the confidentiality of the key while it is stored in the memory of the EML enclave. If written to storage, $\alpha k_\alpha$ is encrypted and authenticated with keys that are only available to the EML. Finally, the EML securely delivers the key to the application after attesting the code of the enclave and after establishing a secure channel. The attestation of the code of the enclave by the EML is again performed using a proxied attestation protocol, such as that described above and shown in FIG. 2. However, by embedding the EML's public key in the application code, attestation between the EML and an application enclave can allow the enclave to authenticate the EML. By authenticating the prover, the application enclaves only accepts provisioning from the EML.

Systems according to one or more embodiments of the present invention can also ensure the consistency of the EML operations and thereby ensure that the number of "running" enclaves in $enc_\alpha$ is compliant with the policy defined by the application owner. In order to do so, systems according to embodiments of the invention ensure that all updates that affect the state of application enclaves are always registered by the storage layer that forms the backbone of ReplicaTEE. Given that the storage layer implements a consistent Byzantine fault tolerant storage service, all registered events are totally ordered on consistent storage. This design tolerates possible asynchrony or network partitioning that could arise in the EML. Namely, since EML enclaves do not run a consistent protocol (they only execute a lightweight node guarding protocol), consistency is guaranteed by the facts that (i) all operations handled by EML enclaves are duly registered on a consistent storage layer and (ii) all operations executed by EML enclaves can be concurrently executed without the need for direct synchronization since the back-to-back execution of the same operations does not breach the security of ReplicaTEE.

Systems according to one or more embodiments of the present invention provision an enclave eid only after the enclave has been attested and the request to be provisioned has been registered by writing the tuple ⟨eid, key, att, ⊥⟩ to the BSL (see, e.g., Algorithm 2, line 9 above). This tuple reflects the fact that eid has been attested and it is ready for provisioning. Similarly, resuming of enclave eid only occurs after the request has been registered by writing the tuple ⟨eid, key, tbr, eol⟩ to the BSL (see, e.g., Algorithm 5, line 5 above). In both cases, the tuple written to storage carries the key established with the eid at the time of attestation. This allows any EML enclave to establish a secure channel with that enclave in order to securely carry out requests. Provisioning or resuming can be carried out, e.g., according to Algorithm 6 described above. Since the BSL ensures that write/read operations are serialized, no other enclave will be provisioned or resumed before the request for eid is dispatched. This holds despite the feet that the EML enclave in charge of handling the request for eid, say $e_{EML}$, may fail, and despite the fact that multiple EML enclaves may concurrently act as masters.

If eid is to be provisioned and $e_{EML}$ fails right alter provisioning the application enclave (see, e.g., Algorithm 6, line 7 above), the new master EML enclave will use the same secret key key to establish a secure channel with eid and provision the application secret key once again. Similarly, if eid is to be resumed and eBML fails right after sending the "resume" command (see, e.g., Algorithm 6, line 9 above), the new master EML enclave will use the same secret key key to establish a secure channel with eid and send once again the "resume" command. In the above scenarios, provisioning or resuming the same enclave does not violate the security provisions of ReplicaTEE. Even if two (or more) EML enclaves acting as masters take in charge the request at the same time, they will both provision (or resume) eid. Also, they will both write the tuple eid key, run, eol (see, e.g., Algorithm 6, line 10 above) to the BSL in order to reflect that the operation has been dispatched. Once again, provisioning/resuming the same enclave and writing the same tuple to storage does not bring ReplicaTEE to an inconsistent state.

Only after the enclave status is set to "run" in the BSL, EML enclaves will start provisioning/resuming another enclave. This ensures that provisioning/resuming of enclaves is carried out in strict sequential order and allows EML enclaves to be always aware of the running application enclaves for a given application.

As discussed before, once C issues a request to terminate or suspend an enclave eid, there is no guarantee that the enclave has been effectively deleted or suspended. This is due to the fact that any attempt from EML to contact eid may be dropped by the adversary that controls the communication network. For this reason, leases and the requirement that application enclaves stop as soon as the current lease expires (unless renewed by the EML) are relied upon. The EML therefore treats an enclave eid as suspended and sets its status accordingly (see, e.g., Algorithm 7, line 5 above) only at the end of the lease. At the time EML receives the request to suspend eid, it simply writes the request to BSL by setting eid's state to "to be suspended" (see, e.g., Algorithm 4, line 5 above). However, the enclave is considered as running until the end of the current lease. A similar approach is taken for requests to delete an enclave eid. The request is written to the BSL, by setting eid's status to "to be deleted" (see, e.g., Algorithm 3, line 5 above). However, the enclave will be considered as running until the end of the current lease. At that time, the enclave metadata is deleted from storage (see, e.g., Algorithm 7, line 7 above).

Enclaves considered as running (i.e., those enclaves having a status set to "running," "to be suspended," or "to be deleted") affect the decision of whether a request to provision/resume an enclave should be completed. That is, an enclave is provisioned/resumed only if the number of enclaves considered as running Is below the threshold set by the application owner (see, e.g., Algorithm 5 above). At the end of a lease, the EML proceeds to renew the lease to all application enclaves with status "running." If an EML enclave crashes after renewing the lease to a given enclave eid, but before writing to the BSL that the operation was completed (see, e.g., Algorithm 7, line 9), then eid will receive the same renewal message from another EML, enclave taking up the master role. Once again, repeating the lease renewal operation issuing the same end-of-lease timestamp to the same enclave does not constitute a security breach.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for executing a trusted execution environment (TEE) based application in a cloud computing system, the method comprising:
    executing a proxied attestation procedure with a client to enable the client to attest that an enclave management layer (EML) application provided by the cloud computing system is correct and runs on a TEE-enabled platform;
    receiving, by the cloud computing system, application code corresponding to the TEE-based application from the client;
    receiving, by the EML application from the client, application parameters corresponding to the TEE-based application, the application parameters including an application secret key;
    writing, by the EML application to a secure storage layer, the application parameters corresponding to the TEE-based application;
    creating, by the cloud computing system, an enclave configured to execute the TEE-based application;
    fetching, by the EML application from the secure storage layer, the application parameters corresponding to the TEE-based application;
    attesting, by the EML application, the enclave configured to execute the TEE-based application based on the application parameters; and
    securely transferring, by the EML application, the application secret key to the enclave configured to execute the TEE-based application.

2. The method according to claim 1, wherein the application parameters corresponding to the TEE-based application further include:
    an expected measurement value of the TEE-based application, and
    an application deployment policy.

3. The method according to claim 2, wherein the expected measurement value is an integrity measurement value of an application binary of the TEE-based application.

4. The method according to claim 2, wherein the application deployment policy includes an upper bound for a number of enclaves configured to run the TEE-based application.

5. The method according to claim 4, the method further comprising creating, by the cloud computing system, a second enclave configured to execute the TEE-based application.

6. The method according to claim 5, wherein the creating, by the cloud computing system, a second enclave configured to execute the TEE-based application comprises:
    performing, by the EML application, a second fetching, from the secure storage layer, of the application parameters corresponding to the TEE-based application;
    determining, by the EML application by using the application parameters corresponding to the TEE-based application, that a number of running enclaves configured to execute the TEE-based application is below the upper bound for the number of enclaves configured to run the TEE-based application; and
    securely transferring, by the EML application, the application secret key to the second enclave by way of a shared secret key.

7. The method according to claim 2, further comprising creating, by the cloud computing system, a second enclave configured to execute the TEE-based application, wherein creating the second enclave includes fetching, by the EML from the secure storage layer, the application parameters corresponding to the TEE-based application a second time, and securely transferring, by the EML application, the application secret key to the second enclave by way of a shared secret key.

8. The method according to claim 7, wherein the creating the second enclave further includes determining, by the EML application by using the application parameters corresponding to the TEE-based application, that the creating the second enclave configured to execute the TEE-based application complies with the application deployment policy.

9. The method according to claim 1, wherein the application secret key is secret from the cloud provider.

10. The method according to claim 1, the method further comprising assigning, by the EML application to the enclave configured to execute the TEE-based application, an enclave identifier.

11. The method according to claim 10, the method further comprising writing to the secure storage layer, enclave management parameters corresponding to the enclave configured to execute the TEE-based application.

12. The method according to claim 11, wherein the enclave management parameters include the enclave identifier, a shared secret key, and a current end-of-lease timestamp.

13. The method according to claim 12, wherein the shared secret key is established during the attesting, by the EML application, the enclave configured to execute the TEE-based application.

14. The method according to claim 11, the method further comprising managing, by the EML application, the enclave configured to execute the TEE-based application.

15. The method according to claim 14, wherein the managing the enclave configured to execute the TEE-based application comprises at least one of terminating, suspending, or resuming the enclave configured to execute the TEE-based application according to the enclave management parameters written to the secure storage layer.

16. A system for executing a trusted execution environment (TEE) based application in a cloud computing system, the system comprising:
    a processor readable memory including a secure storage layer; and
    one or more processors configured to carry out the method of claim 1.

17. A non-transitory computer readable medium having stored thereon instructions for carrying out a method for executing a trusted execution environment (TEE) based application in a cloud computing system, the method comprising:
    executing a proxied attestation procedure with a client to enable the client to attest that an enclave management layer (EML) application provided by the cloud computing system runs on a TEE-enabled platform;
    receiving, by the cloud computing system from the client, application code corresponding to the TEE-based application;
    receiving, by the EML application from the client, application parameters corresponding to the TEE-based application, the application parameters including an application secret key;
    writing, by the EML application to a secure storage layer, the application parameters corresponding to the TEE-based application;

creating, by the cloud computing system, an enclave configured to execute the TEE-based application;
fetching, by the EML application from the secure storage layer, the application parameters corresponding to the TEE-based application;
attesting, by the EML application, the enclave configured to execute the TEE-based application;
securely transferring, by the EML application, the application secret key to the enclave configured to execute the TEE-based application.

* * * * *